(12) United States Patent
Zhou et al.

(10) Patent No.: US 11,632,198 B2
(45) Date of Patent: Apr. 18, 2023

(54) REDUNDANCY VERSION IDENTIFICATION IN CROSS-CARRIER REPETITION

(71) Applicant: QUALCOMM Incorporated, San Diego, CA (US)

(72) Inventors: Yan Zhou, San Diego, CA (US); Tao Luo, San Diego, CA (US); Mostafa Khoshnevisan, San Diego, CA (US); Seyed Ali Akbar Fakoorian, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 16/946,902

(22) Filed: Jul. 10, 2020

(65) Prior Publication Data
US 2021/0028892 A1    Jan. 28, 2021

Related U.S. Application Data

(60) Provisional application No. 62/878,993, filed on Jul. 26, 2019.

(51) Int. Cl.
| | |
|---|---|
| *H04W 72/04* | (2009.01) |
| *H04W 72/12* | (2009.01) |
| *H04L 1/16* | (2006.01) |
| *H04L 1/1812* | (2023.01) |
| *H04W 72/14* | (2009.01) |
| *H04L 5/00* | (2006.01) |

(52) U.S. Cl.
CPC ......... *H04L 1/1819* (2013.01); *H04W 72/042* (2013.01); *H04W 72/0493* (2013.01); *H04W 72/14* (2013.01); *H04L 5/001* (2013.01)

(58) Field of Classification Search
None
See application file for complete search history.

(56) References Cited

U.S. PATENT DOCUMENTS

| | | | |
|---|---|---|---|
| 8,379,585 B2* | 2/2013 | Lee | H04W 4/90 370/329 |
| 10,965,407 B2* | 3/2021 | Ying | H04L 1/1819 |

(Continued)

FOREIGN PATENT DOCUMENTS

| | | |
|---|---|---|
| WO | 2018059173 A1 | 4/2018 |
| WO | 2018126857 A1 | 7/2018 |

OTHER PUBLICATIONS

International Search Report and Written Opinion—PCT/US2020/070261—ISA/EPO—dated Nov. 2, 2020.

*Primary Examiner* — Sai Aung
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for a first redundancy version (RV) pattern for a first semi-persistent transmission associated with a data transmission on a first component carrier and a second RV pattern for a second semi-persistent transmission associated with a repetition of the data transmission on a second component carrier. The UE may receive or transmit the data transmission and the repetition of the data transmission based at least in part on the configuration. Numerous other aspects are provided.

32 Claims, 10 Drawing Sheets

(56) References Cited

U.S. PATENT DOCUMENTS

| | | | |
|---|---|---|---|
| 2011/0116454 A1* | 5/2011 | Chen | H04L 5/0096 |
| | | | 370/329 |
| 2012/0057560 A1 | 3/2012 | Park et al. | |
| 2018/0020382 A1 | 1/2018 | Kim et al. | |
| 2018/0159656 A1 | 6/2018 | Papasakellariou | |
| 2018/0359735 A1* | 12/2018 | Lee | H04W 72/044 |
| 2019/0174466 A1* | 6/2019 | Zhang | H04L 5/005 |
| 2019/0253197 A1* | 8/2019 | Babaei | H04L 1/1887 |
| 2019/0281588 A1* | 9/2019 | Zhang | H04L 5/0051 |
| 2019/0349964 A1* | 11/2019 | Liou | H04W 72/1284 |

\* cited by examiner

REDUNDANCY VERSION IDENTIFICATION IN CROSS-CARRIER REPETITION

CROSS-REFERENCE TO RELATED APPLICATION

This patent application claims priority to U.S. Provisional Patent Application No. 62/878,993, filed on Jul. 26, 2019, entitled "REDUNDANCY VERSION IDENTIFICATION IN CROSS-CARRIER REPETITION," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for redundancy version identification in cross-carrier repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, transmissions between a UE and a base station may sometimes fail. For example, transmissions may fail due to movement of the UE, obstructions between the UE and the base station, poor signal quality, environmental conditions, or malfunctioning of the UE or the base station. In such cases, a failed transmission may be retransmitted, thereby improving overall reliability of the wireless network. However, in some cases, retransmission of the failed transmission may not be feasible. For example, transmissions according to semi-persistent scheduling (SPS) or a configured grant (CG) may occur at defined intervals, which may be relatively short in duration. As a result, there may be insufficient time between SPS or CG transmissions to schedule a retransmission of a failed transmission.

SUMMARY

In some aspects, a method of wireless communication, performed by a user equipment (UE), may include receiving a configuration for a first redundancy version (RV) pattern for a first semi-persistent transmission associated with a data transmission on a first component carrier and a second RV pattern for a second semi-persistent transmission associated with a repetition of the data transmission on a second component carrier; and receiving or transmitting the data transmission and the repetition of the data transmission based at least in part on the configuration.

In some aspects, a method of wireless communication, performed by a base station, may include determining, for a UE, a configuration for a first RV pattern for a first semi-persistent transmission associated with a data transmission on a first component carrier and a second RV pattern for a second semi-persistent transmission associated with a repetition of the data transmission on a second component carrier; and transmitting the configuration to the UE.

In some aspects, a UE for wireless communication may include memory and one or more processors operatively coupled to the memory. The memory and the one or more processors may be configured to receive a configuration for a first RV pattern for a first semi-persistent transmission associated with a data transmission on a first component carrier and a second RV pattern for a second semi-persistent transmission associated with a repetition of the data transmission on a second component carrier; and receive or transmit the data transmission and the repetition of the data transmission based at least in part on the configuration.

In some aspects, a base station for wireless communication may include memory and one or more processors operatively coupled to the memory. The memory and the one or more processors may be configured to determine, for a UE, a configuration for a first RV pattern for a first semi-persistent transmission associated with a data transmission on a first component carrier and a second RV pattern for a second semi-persistent transmission associated with a repetition of the data transmission on a second component carrier; and transmit the configuration to the UE.

In some aspects, a non-transitory computer-readable medium may store one or more instructions for wireless communication. The one or more instructions, when executed by one or more processors of a UE, may cause the one or more processors to receive a configuration for a first RV pattern for a first semi-persistent transmission associated with a data transmission on a first component carrier and a second RV pattern for a second semi-persistent transmission associated with a repetition of the data transmission on a second component carrier; and receive or transmit the data transmission and the repetition of the data transmission based at least in part on the configuration.

In some aspects, a non-transitory computer-readable medium may store one or more instructions for wireless communication. The one or more instructions, when executed by one or more processors of a base station, may cause the one or more processors to determine, for a UE, a configuration for a first RV pattern for a first semi-persistent transmission associated with a data transmission on a first component carrier and a second RV pattern for a second semi-persistent transmission associated with a repetition of the data transmission on a second component carrier; and transmit the configuration to the UE.

In some aspects, an apparatus for wireless communication may include means for receiving a configuration for a first RV pattern for a first semi-persistent transmission associated with a data transmission on a first component carrier and a second RV pattern for a second semi-persistent transmission associated with a repetition of the data transmission on a second component carrier; and means for receiving or transmitting the data transmission and the repetition of the data transmission based at least in part on the configuration.

In some aspects, an apparatus for wireless communication may include means for determining, for a UE, a configuration for a first RV pattern for a first semi-persistent transmission associated with a data transmission on a first component carrier and a second RV pattern for a second semi-persistent transmission associated with a repetition of the data transmission on a second component carrier; and means for transmitting the configuration to the UE.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
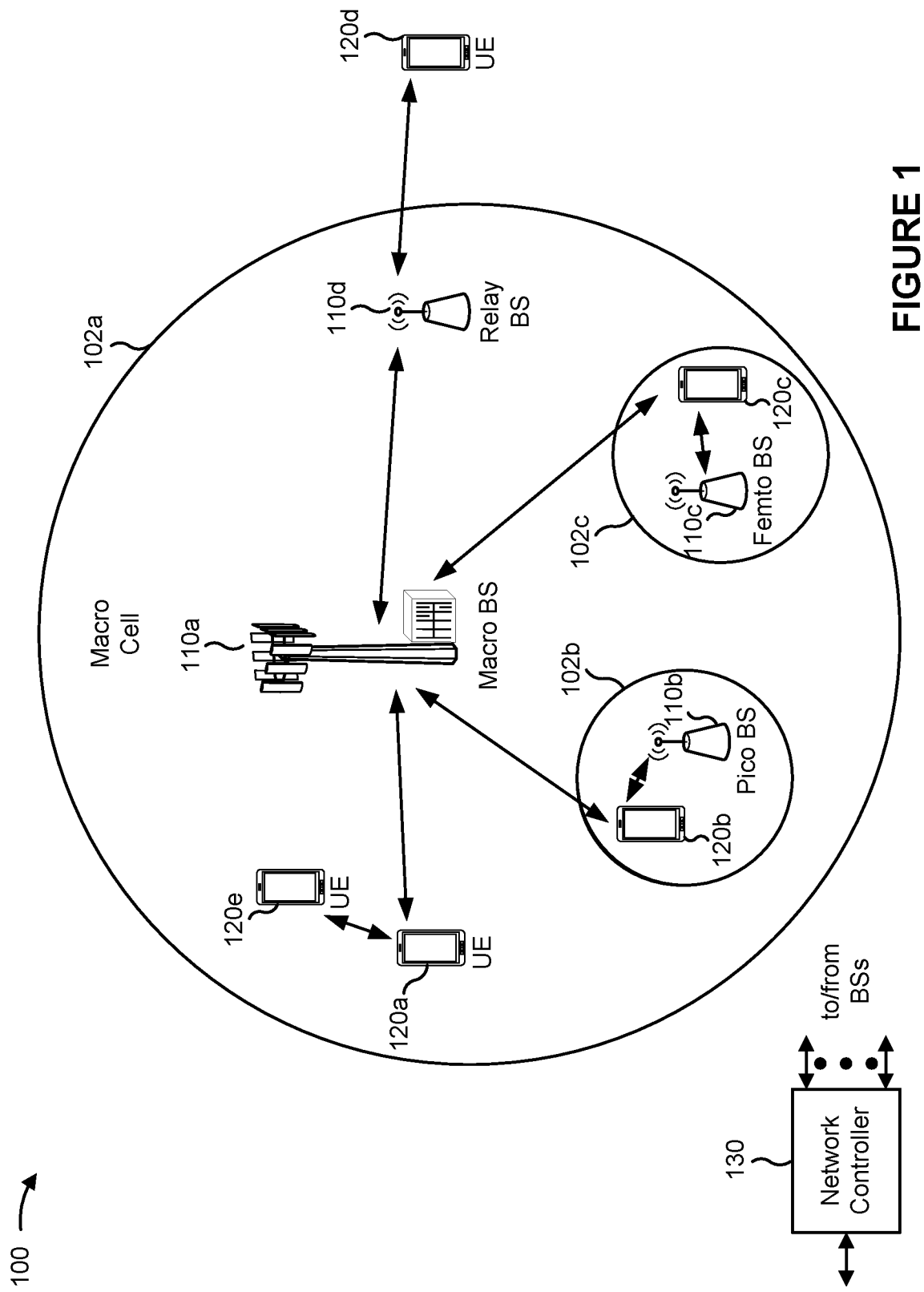
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

In a wireless network, data transmissions between a user equipment (UE) and a base station may sometimes fail. In some cases, retransmission of a failed data transmission may not be feasible. For example, data transmissions according to semi-persistent scheduling (SPS) or a configured grant (CG) may occur at defined cycles, which may be relatively short in duration. As a result, there may be insufficient time between SPS or CG data transmissions to schedule a retransmission of a failed data transmission. In some cases, multiple repetitions of a data transmission may be transmitted across multiple component carriers during the same SPS or CG cycle when there is insufficient time between SPS or CG transmissions to schedule retransmissions. Each of the repetitions may be associated with a particular redundancy version (RV) of the data transmission. However, prior wireless communication systems do not facilitate identification of RVs used in cross-carrier repetitions of a data transmission.

Some aspects of the present disclosure described herein provide techniques and apparatuses for RV identification in cross-carrier repetitions of data transmissions. In some aspects, a base station may determine a configuration for an RV pattern and transmit the configuration to a UE. The RV pattern may relate to SPS data transmissions or CG data transmissions. The base station and the UE may use the configuration to transmit or receive multiple repetitions of a data transmission across multiple component carriers. In this way, the repetition of a data transmission across multiple component carriers improves a reliability of the data transmission, particularly when retransmission is not feasible.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
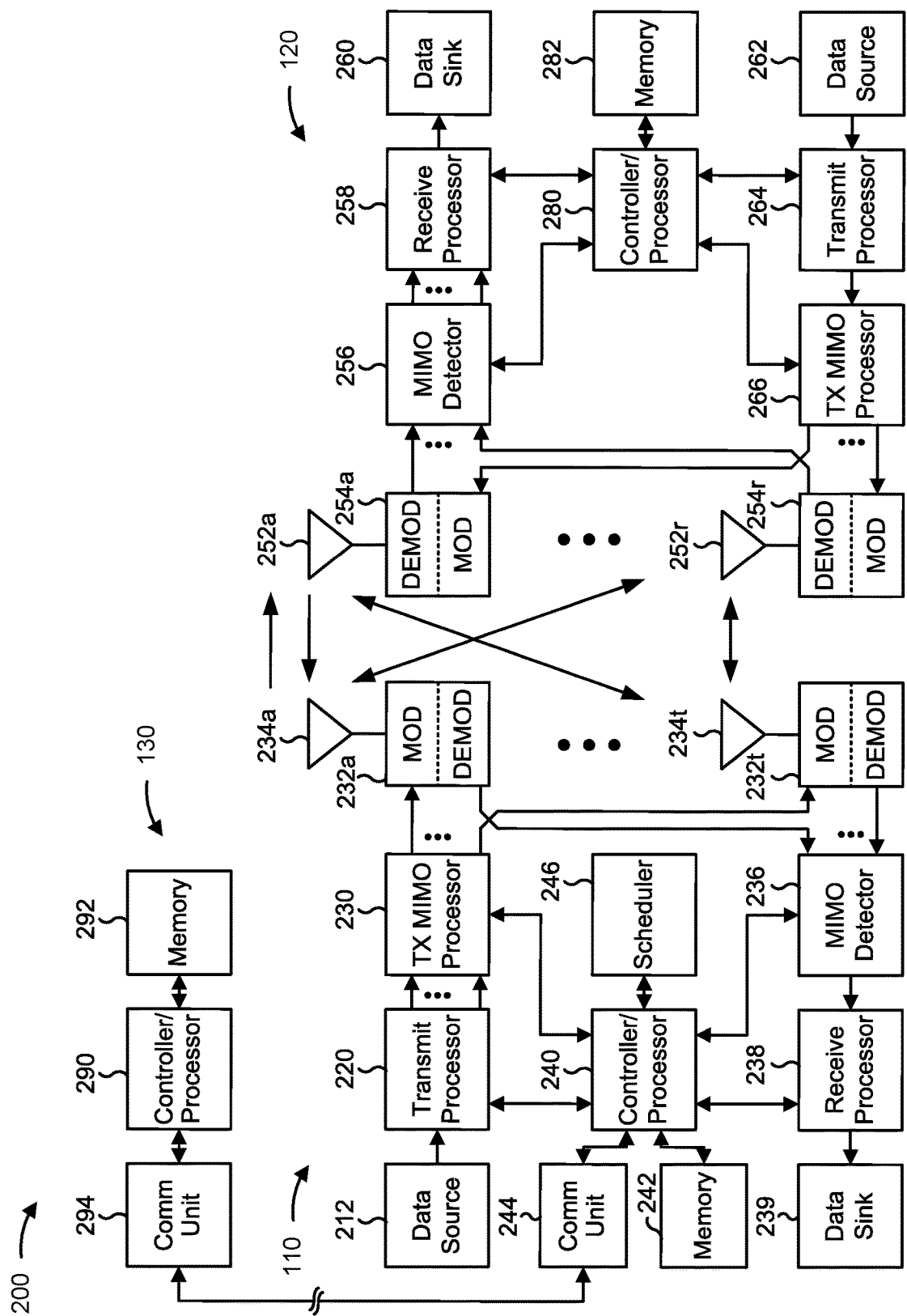
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with redundancy version (RV) identification in cross-carrier repetition, as described in more detail elsewhere herein. For example, controller/processor 240 of base station 110, controller/processor 280 of UE 120, or any other component(s) of FIG. 2 may perform or direct operations of, for example, process 700 of FIG. 7, process 800 of FIG. 8, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a configuration for a first RV pattern for a first semi-persistent transmission associated with a data transmission on a first component carrier and a second RV pattern for a second semi-persistent transmission associated with a repetition of the data transmission on a second component carrier, means for receiving or transmitting the data transmission and the repetition of the data transmission based at least in part on the configuration, or the like, or combinations thereof. In some aspects, such means may include one or more components of UE 120 described in connection with FIG. 2.

In some aspects, base station 110 may include means for determining, for a UE, a configuration for a first RV pattern for a first semi-persistent transmission associated with a data transmission on a first component carrier and a second RV pattern for a second semi-persistent transmission associated with a repetition of the data transmission on a second component carrier, means for transmitting the configuration to the UE, or the like, or combinations thereof. In some aspects, such means may include one or more components of base station 110 described in connection with FIG. 2.

Figure 3:
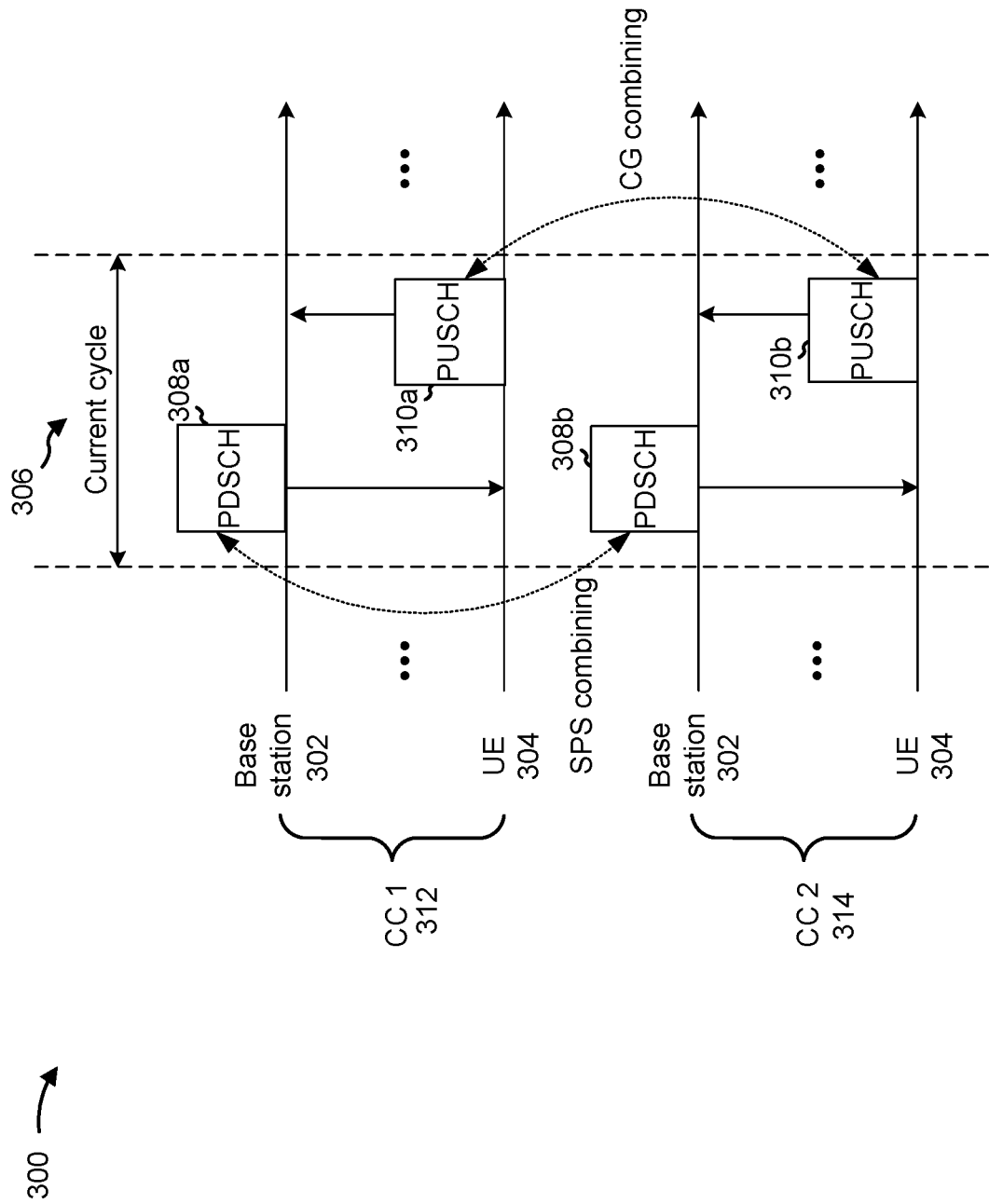
FIG. 3 is a diagram illustrating an example of cross-carrier repetition in accordance with various aspects of the present disclosure.

FIG. 3 is a diagram illustrating an example of cross-carrier repetition in accordance with various aspects of the present disclosure. As shown in FIG. 3, a communication flow between a base station 302 and a UE 304 may have a current cycle 306. In some aspects, the base station 302 may correspond to one or more other base stations described elsewhere herein, such as base station 110. In some aspects, the UE 304 may correspond to one or more other UEs described elsewhere herein, such as UE 120.

As shown in FIG. 3, the base station 302 may transmit a data transmission to the UE 304. For example, the base station 302 may transmit a first repetition 308*a* of the data transmission (for example, on a physical downlink shared channel (PDSCH)) to the UE 304 over a first component carrier 312 (CC1). The base station 302 may transmit a second repetition 308*b* of the data transmission over a second component carrier 314 (CC2). The repetitions 308*a*, 308*b* of the data transmission may be associated with semi-persistent scheduling (SPS) and combined accordingly. For example, the UE 304 may combine the first repetition 308*a* and the second repetition 308*b* of the data transmission, received in the current cycle 306, in order to facilitate decoding of the data transmission.

As further shown in FIG. 3, the UE 304 also may transmit a data transmission to the base station 302. For example, the UE 304 may transmit a first repetition 310*a* of the data transmission (for example, on a physical uplink shared channel (PUSCH)) to the base station 302 over the first component carrier 312. The UE 304 may transmit a second repetition 310*b* of the data transmission over the second component carrier 314. The repetitions 310*a*, 310*b* of the data transmission may be associated with a configured grant (CG) and combined accordingly. For example, the base station 302 may combine the first repetition 310*a* and the second repetition 310*b* of the data transmission, received in the current cycle 306, in order to facilitate decoding of the data transmission.

In some aspects, multiple repetitions of a data transmission may be transmitted according to a repetition configuration. For example, the base station 302 may determine the repetition configuration and signal the repetition configuration to the UE 304. The repetition configuration may indicate which component carriers to use for transmitting or receiving repetitions.

In some cases, each repetition of a data transmission may be a particular RV of the data transmission (for example, an RV associated with a hybrid automatic repeat request (HARQ) process). Some aspects of the present disclosure described herein provide techniques and apparatuses for RV identification in cross-carrier repetitions of data transmissions. In some aspects, a base station may determine a configuration for an RV pattern and transmit the configuration to a UE. The RV pattern may relate to SPS data transmissions or CG data transmissions. The base station and the UE may use the configuration to transmit or receive multiple repetitions of a data transmission across multiple component carriers. In this way, the repetition of a data transmission across multiple component carriers improves a reliability of the data transmission, particularly when retransmission is not feasible.

Figure 4:
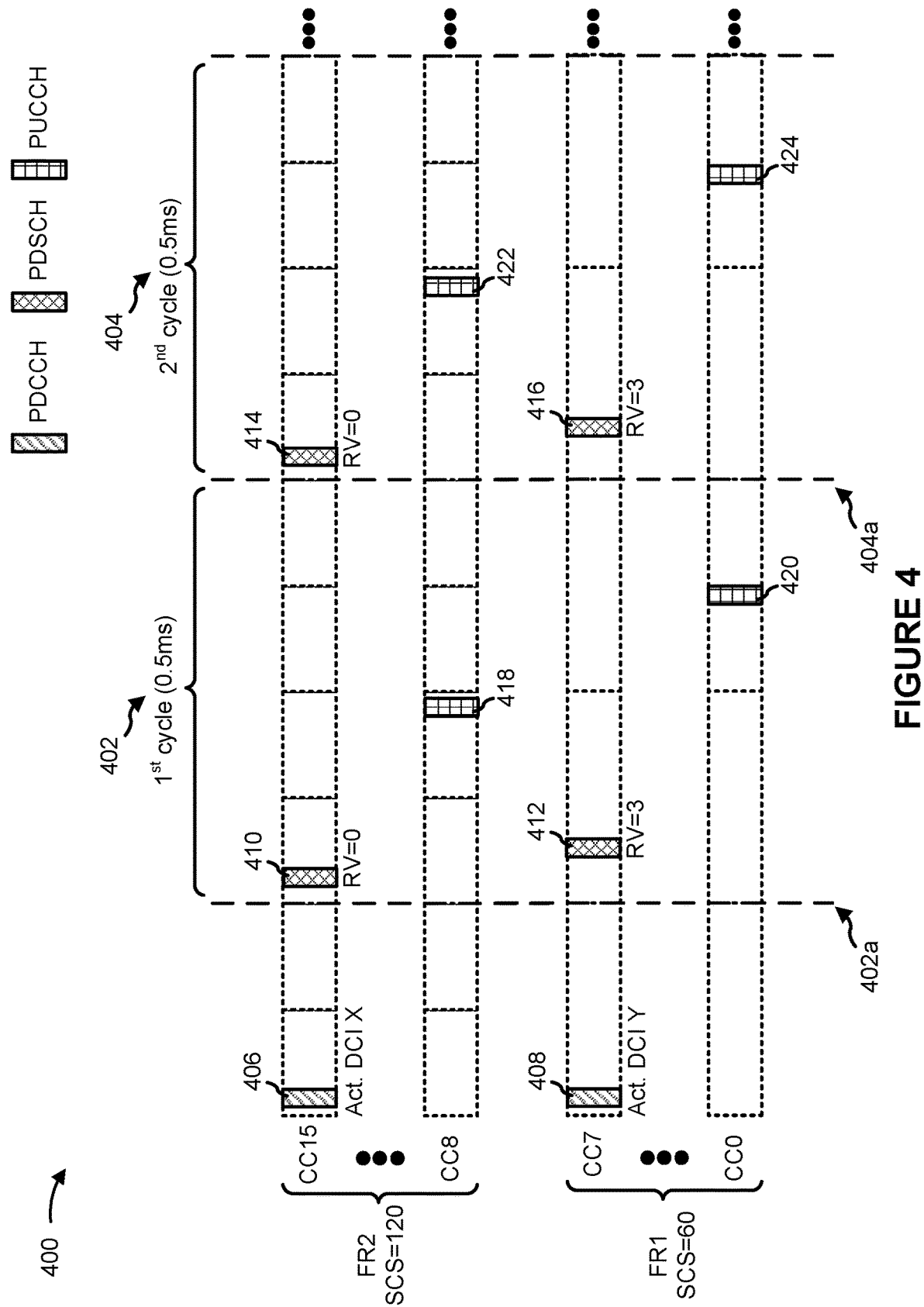
FIG. 4 is a diagram illustrating an example of redundancy version (RV) identification in cross-carrier repetition in accordance with various aspects of the present disclosure.

FIG. 4 is a diagram illustrating an example of RV identification in cross-carrier repetition in accordance with various aspects of the present disclosure. FIG. 4 shows SPS data transmissions occurring across component carriers. The SPS data transmissions may be transmitted by a base station and received by a UE. In some aspects, the base station may correspond to one or more other base stations described elsewhere herein, such as base station 110 or base station 302. In some aspects, the UE may correspond to one or more other UEs described elsewhere herein, such as UE 120 or UE 304.

As shown in FIG. 4, a first component carrier (CC15) and a second component carrier (CC7) may be used to transmit downlink communications. A third component carrier (CC8) may be used to transmit uplink control transmissions associated with downlink data transmissions received via the first component carrier (CC15). A fourth component carrier (CC0) may be used to transmit uplink control transmissions associated with downlink data transmissions received via the second component carrier (CC7). In some aspects, the first component carrier (CC15) and the third component carrier (CC8) may be associated with a first frequency range and a first subcarrier spacing, and the second component carrier (CC7) and the fourth component carrier (CC0) may be associated with a second frequency range and a second subcarrier spacing. However, in some aspects, the component carriers may be associated with the same frequency range or the same subcarrier spacing.

The example shown in FIG. 4 includes a first cycle 402 and a second cycle 404. The start of the first cycle 402 may be defined by a first common start boundary 402*a*. The start of the second cycle 404 may be defined by a second common start boundary 404*a*. The common start boundaries 402*a*, 404*a* may be determined based at least in part on a common frame boundary (for example, system frame number (SFN)=0) or via downlink control information (DCI) signaling. The cycles 402, 404 may be associated with the transmission of respective data transmissions. For example, repetitions of a first data transmission may be received during the first cycle 402, and repetitions of a second data transmission may be received during the second cycle 404. As shown in FIG. 4, the cycles 402, 404 have a duration of 0.5 milliseconds; however, other durations are possible.

As also shown in FIG. 4, the UE may receive a downlink control transmission 406 over the first component carrier (CC15) and a downlink control transmission 408 over the second component carrier (CC7). The base station may transmit the downlink control transmissions 406, 408 to the UE via radio resource control (RRC) signaling, DCI signaling (for example, activation DCI signaling), or a medium access control (MAC) control element. The downlink control transmissions 406, 408 may provide an SPS configuration for the corresponding component carriers. For example, the downlink control transmission 406 (Activation DCI X) may activate an SPS configuration X for the first component carrier (CC15), and the downlink control transmission 408 (Activation DCI Y) may activate an SPS configuration Y for the second component carrier (CC7).

The downlink control transmissions 406, 408 also may identify a repetition configuration indicating the component carriers that the UE is to use for receiving repetitions. For example, during the first cycle 402, the UE may receive, according to the repetition configuration, a first data transmission (also referred to herein as a "first repetition" of the first data transmission) 410 over the first component carrier (CC15) and a second repetition 412 of the first data transmission over the second component carrier (CC7). During the second cycle 404, the UE may receive, according to the repetition configuration, a first repetition 414 of the second data transmission over the first component carrier (CC15) and a second repetition 416 of the second data transmission over the second component carrier (CC7).

In some aspects, repetitions of the first data transmission and the second data transmission may be associated with particular RVs. For example, the first repetition 410 of the first data transmission may be associated with a first RV and the second repetition 412 of the first data transmission may be associated with a second RV. Accordingly, the downlink control transmissions 406, 408 also may identify an RV configuration that the UE is to use for receiving repetitions for the corresponding component carriers. For example, the SPS configuration X for the first component carrier (CC15) may identify an RV pattern for the first component carrier (CC15), and the SPS configuration Y for the second component carrier (CC7) may identify an RV pattern for the second component carrier (CC7).

In some aspects, as shown in FIG. 4, the RV configuration may identify a first RV for the first component carrier (CC15) and a second RV for the second component carrier (CC7). For example, the first repetition 410 of the first data transmission and the first repetition 414 of the second data transmission, which occur on the same component carrier (CC15), may use a same first RV (for example, RV=0). Similarly, the second repetition 412 of the first data transmission and the second repetition 416 of the second data transmission, which occur on the same component carrier (CC7), may use a same second RV (for example, RV=3).

In some aspects, the RV configuration may identify a first RV order for the first component carrier (CC15) and a second RV order for the second component carrier (CC7). An RV order may identify a particular order of RVs (for example, 1, 2, 3, 0) that are to be used in a cycle for periodic data transmissions (for example, SPS data transmissions). Additionally, an RV order may identify a starting RV that is to be used in a cycle for periodic data transmissions. For example, if the identified starting RV is 3, a data transmission in a first cycle may be RV=3, a data transmission in a second cycle may be RV=0, a data transmission in a third cycle may be RV=1, a data transmission in a fourth cycle may be RV=2, and so forth. Thus, according to an RV order, each subsequent data transmission on a component carrier may use a corresponding subsequent RV of the RV order.

The first RV order and the second RV order may be different, such that an RV at an index location of the first RV order does not correspond to an RV at the index location of the second RV order. For example, in the first cycle 402, the first repetition 410 of the first data transmission on the first component carrier (CC15) may be a first RV (for example, RV=1), and the second repetition 412 of the first data transmission on the second component carrier (CC7) may be a second RV (for example, RV=2). Continuing with the previous example, in the second cycle 404, the first repetition 414 of the second data transmission on the first component carrier (CC15) may be the second RV (for example, RV=2), and the second repetition 416 of the second data transmission on the second component carrier (CC7) may be the first RV (for example, RV=1), and so forth.

Although the example of FIG. 4 shows two RVs on two component carriers for data transmissions, in some aspects, three or more RVs (for example, RVs 0, 1, 2, 3) may be used on three or more component carriers. For example, in a first cycle, a repetition on a first component carrier may use RV=0, a repetition on a second component carrier may use RV=1, and a repetition on a third component carrier may use RV=2. Continuing with the previous example, in a second cycle, a repetition on the first component carrier may use RV=1, a repetition on the second component carrier may use RV=2, and a repetition on a third component carrier may use RV=0, and so forth.

In some aspects, the first cycle 402 may be the first complete cycle, after a common frame boundary (for example, SFN=0), of the data transmissions on the first component carrier (CC15) and the data transmissions on the second component carrier (CC7). For example, a first transmission cycle (for example, an SPS transmission cycle) associated with the first component carrier (CC15) and a second transmission cycle associated with the second component carrier (CC7) may have the same periodicity. In such a case, the UE may receive the data transmissions on the first and second component carriers with reference to a same start boundary of the first transmission cycle and the second transmission cycle.

In some aspects, the UE may combine received repetitions of a data transmission in order to decode the data transmission. In some aspects, the UE may combine repetitions of a data transmission received in the same cycle in order to decode the data transmission. For example, the UE may combine the first repetition 410 of the first data transmission and the second repetition 412 of the first data transmission, received in the first cycle 402, in order to decode the first data transmission, for example, for greater reliability.

In some aspects, the UE may transmit acknowledgment (ACK) or negative-acknowledgement (NACK) feedback for the first data transmission and the second data transmission. The UE may transmit ACK or NACK feedback for a data transmission based at least in part on whether the UE was able to properly decode the data transmission. As shown in FIG. 4, the UE may transmit ACK or NACK feedback for the first repetition 410 of the first data transmission over the third component carrier (CC8) in an uplink control transmission 418. The UE may transmit ACK or NACK feedback for the second repetition 412 of the first data transmission over the fourth component carrier (CC0) in an uplink control transmission 420. Similarly, the UE may transmit ACK or NACK feedback for the first repetition 414 of the second data transmission over the third component carrier (CC8) in an uplink control transmission 422. The UE may transmit ACK or NACK feedback for the second repetition 416 of the second data transmission over the fourth component carrier (CC0) in an uplink control transmission 424.

Figure 5:
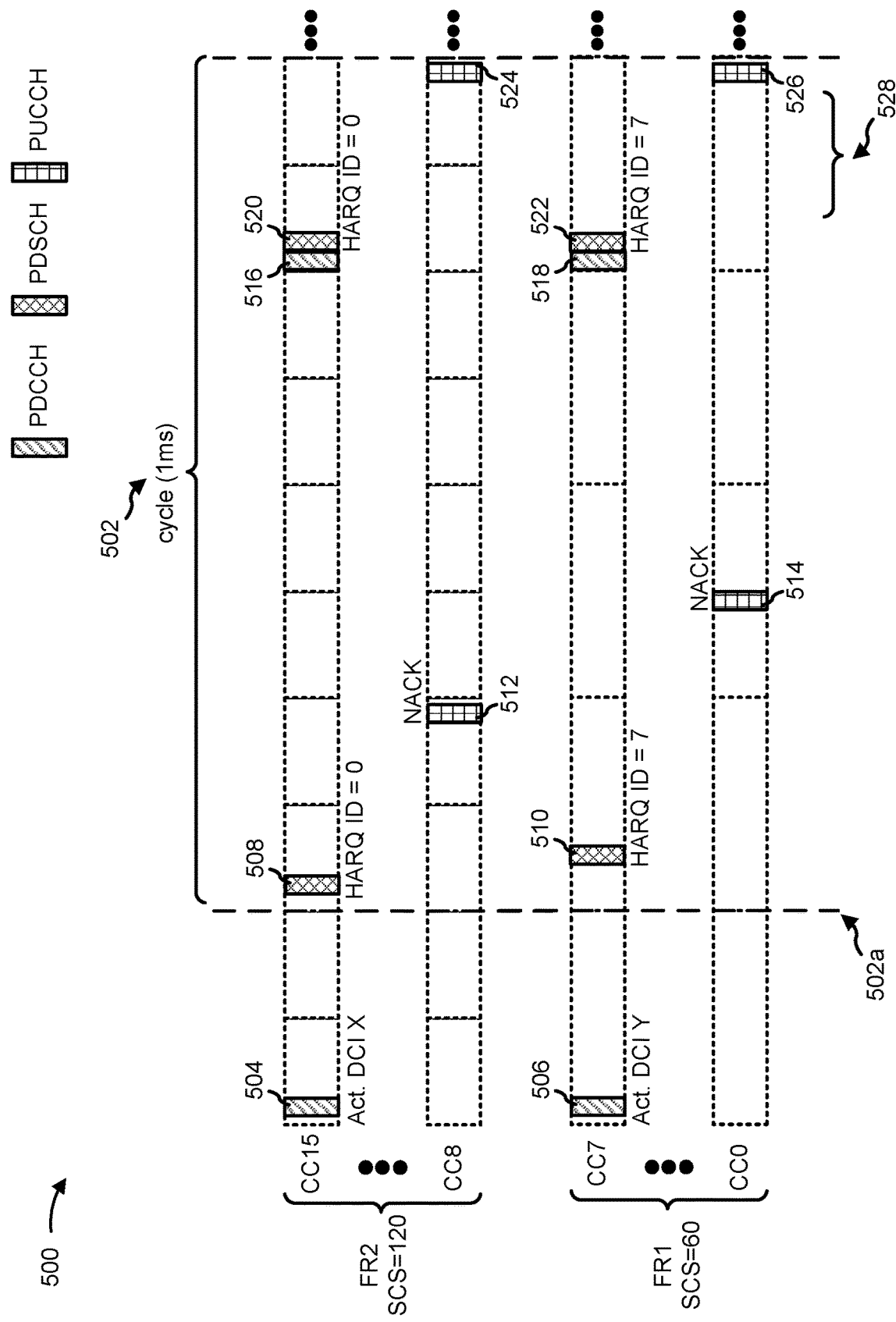
FIGS. 5 and 6 are diagrams illustrating examples of scheduling retransmissions of cross-carrier repetitions in accordance with various aspects of the present disclosure.

FIG. 5 is a diagram illustrating an example of scheduling retransmissions of cross-carrier repetitions in accordance with various aspects of the present disclosure. FIG. 5 shows SPS data transmissions occurring across component carriers. The SPS data transmissions may be transmitted by a base station and received by a UE. In some aspects, the base station may correspond to one or more other base stations described elsewhere herein, such as base station 110 or base station 302. In some aspects, the UE may correspond to one or more other UEs described elsewhere herein, such as UE 120 or UE 304.

As shown in FIG. 5, a first component carrier (CC15) and a second component carrier (CC7) may be used to transmit downlink communications, a third component carrier (CC8) may be used to transmit uplink control transmissions associated with downlink data transmissions received via the first component carrier (CC15), and a fourth component carrier (CC0) may be used to transmit uplink control transmissions associated with downlink data transmissions received via the second component carrier (CC7), as described in more detail above in connection with FIG. 4. The example of FIG. 5 includes a cycle 502 that may be defined by a common start boundary 502a, as described in more detail above in connection with FIG. 4. As shown in FIG. 5, the cycle 502 has a duration of 1 millisecond; however, other durations are possible.

As also shown by FIG. 5, the UE may receive a downlink control transmission 504 over the first component carrier (CC15) and a downlink control transmission 506 over the second component carrier (CC7), as described in more detail above in connection with FIG. 4. During the cycle 502, the UE may receive, according to a repetition configuration, a data transmission (also referred to herein as a "first repetition" of the data transmission) 508 over the first component carrier (CC15) and a second repetition 510 of the data transmission over the second component carrier (CC7). The first repetition 508 and the second repetition 510 may be associated with the same transport block. According to an RV configuration, the first repetition 508 may be a first RV and the second repetition 510 may be a second RV. Moreover, the first repetition 508 may be associated with a first HARQ process identifier (HARQ ID=0) and the second repetition 510 may be associated with a second HARQ process identifier (HARQ ID=7). The HARQ process identifiers may be designated by downlink control transmissions 504, 506.

In some aspects, the UE may generate, and transmit, a common ACK or NACK feedback to the data transmission, as described below. In some cases, the UE may transmit NACK feedback for the data transmission. For example, the UE may transmit NACK feedback for the first repetition 508 over the third component carrier (CC8) in an uplink control transmission 512. Similarly, the UE may transmit NACK feedback for the second repetition 510 over the fourth component carrier (CC0) in an uplink control transmission 514.

The base station may receive the NACK feedback in the uplink control transmissions 512, 514 and may schedule a retransmission (for example, a non-SPS transmission) of the data transmission. For example, the base station may schedule the retransmission based at least in part on a determination that NACK feedback was received from the UE for all repetitions of the data transmission in the cycle 502. The base station may schedule a retransmission of a repetition on a component carrier using a same HARQ process identifier as the failed transmission of the repetition on the component carrier. For example, the base station may transmit a downlink control transmission 516 (for example, DCI) over the first component carrier (CC15) that schedules a retransmission of the first repetition 508, and may transmit a downlink control transmission 518 (for example, DCI) over the second component carrier (CC7) that schedules a retransmission of the second repetition 510. The downlink control transmission 516 may schedule the retransmission of the first repetition 508 using the same HARQ process identifier (HARQ ID=0) that was used for transmission of the first repetition 508. The downlink control transmission 518 may schedule the retransmission of the second repetition 510 using the same HARQ process identifier (HARQ ID=7) that was used for transmission of the second repetition 510.

In this way, the UE may identify a retransmission based at least in part on a determination that a HARQ process identifier has repeated. For example, after transmitting NACK feedback for the first repetition 508, the UE may identify the retransmission 520 of the first repetition 508 based at least in part on the downlink control transmission 516 scheduling a transmission on the same component carrier (CC15) using the same HARQ process identifier (HARQ ID=0) as the transmission of the first repetition 508. Similarly, after transmitting NACK feedback for the second repetition 510, the UE may identify the retransmission 522 of the second repetition 510 based at least in part on the downlink control transmission 518 scheduling a transmission on the same component carrier (CC7) using the same HARQ process identifier (HARQ ID=7) as the transmission of the second repetition 510. In some aspects, identification of the retransmissions 520, 522 may further be based at least in part on identifying that the downlink control transmissions 516, 518 have been scrambled by a configured scheduling-radio network temporary identifier (CS-RNTI) or a new data indicator (NDI) of the downlink control transmissions 516, 518 that indicates no new data (for example, an NDI not being toggled).

In some aspects, the UE may generate a common ACK or NACK feedback to the retransmissions 520, 522. The UE may generate the common ACK or NACK feedback based at least in part on a temporal distance 528 between receiving a retransmission 520, 522 and transmitting an uplink control transmission 524, 526. In such a case, the UE may generate the common ACK or NACK feedback based at least in part on a determination that temporal distances 528 for all retransmissions 520, 522 are within a threshold range. The UE may transmit the common ACK or NACK feedback in the uplink control transmissions 524, 526.

Figure 6:
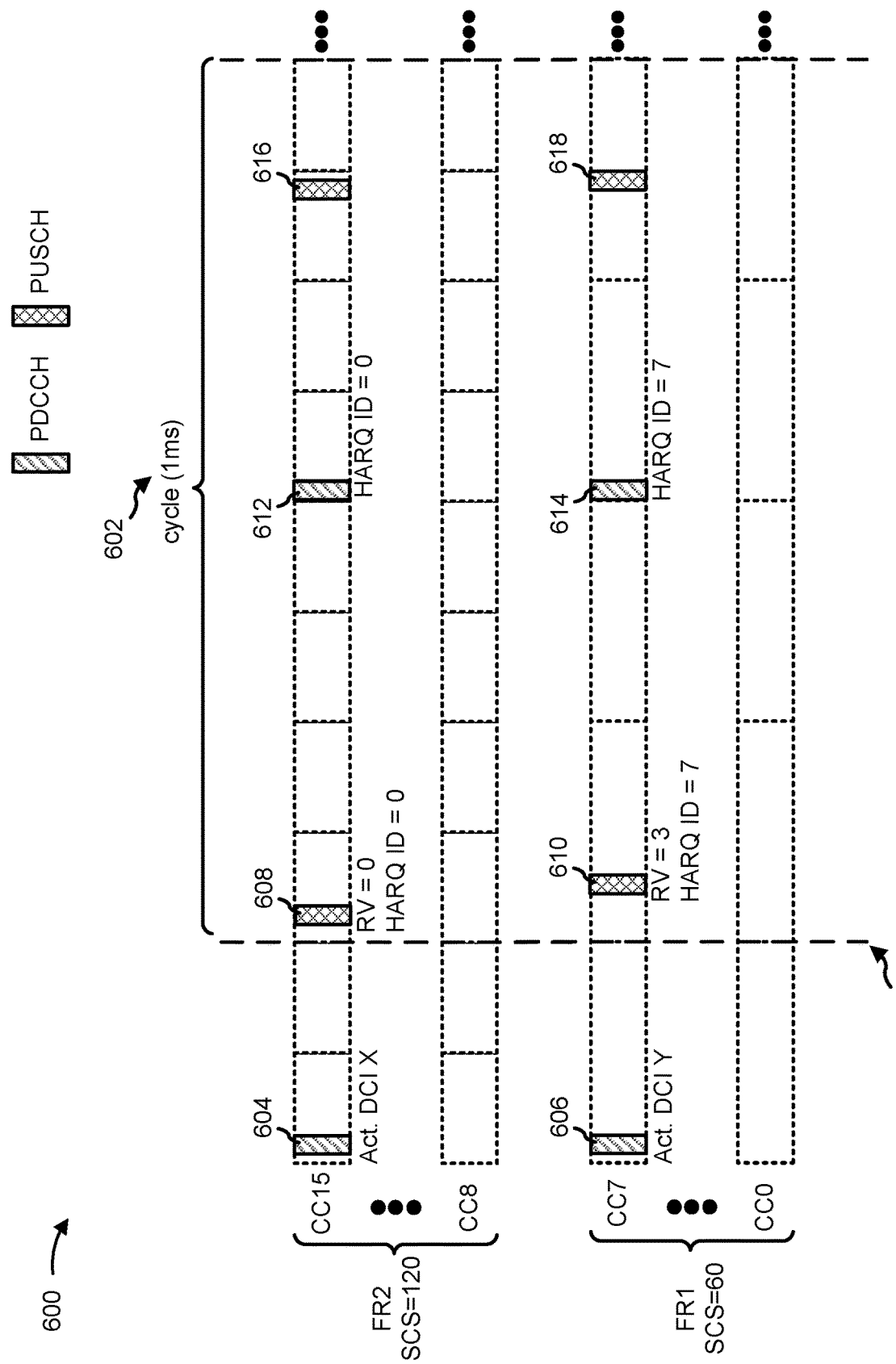

FIG. 6 is a diagram illustrating an example of scheduling retransmissions in cross-carrier repetition in accordance with various aspects of the present disclosure. FIG. 6 shows CG data transmissions occurring across component carriers. The CG data transmissions may be transmitted by a UE and received by a base station. In some aspects, the UE may correspond to one or more other UEs described elsewhere herein, such as UE 120 or UE 304. In some aspects, the base station may correspond to one or more other base stations described elsewhere herein, such as base station 110 or base station 302.

As shown in FIG. 6, a first component carrier (CC15) and a second component carrier (CC7), which are described in more detail above in connection with FIG. 4, may be used to receive downlink control transmissions and to transmit uplink data transmissions. The example of FIG. 6 includes a cycle 602 that may be defined by a common start boundary 602a, as described in more detail above in connection with FIG. 4. As shown in FIG. 6, the cycle 602 has a duration of 1 millisecond; however, other durations are possible.

As also shown by FIG. 6, the UE may receive a downlink control transmission 604 over the first component carrier (CC15) and a downlink control transmission 606 over the second component carrier (CC7). The downlink control transmissions 604, 606 may provide a CG for the corresponding component carriers. For example, the downlink control transmission 604 (Activation DCI X) may activate a CG X for the first component carrier (CC15), and the downlink control transmission 606 (Activation DCI Y) may activate a CG Y for the second component carrier (CC7). The downlink control transmissions 604, 606 also may identify a repetition configuration and an RV configuration, as described in more detail above in connection with FIG. 4.

During the cycle 602, the UE may transmit, according to the repetition configuration, a data transmission (also referred to herein as a "first repetition" of the data transmission) 608 over the first component carrier (CC15) and a second repetition 610 of the data transmission over the second component carrier (CC7). The first repetition 608 and the second repetition 610 may be associated with the same transport block. In addition, according to the RV configuration, the first repetition 608 may be associated with a first RV (RV=0) and the second repetition 610 may be associated with a second RV (RV=3). Moreover, the first repetition 608 may be associated with a first HARQ process identifier (HARQ ID=0) and the second repetition 610 may be associated with a second HARQ process identifier (HARQ ID=7).

In some aspects, the base station may determine that the data transmission of the UE failed. For example, the base station may determine that the data transmission failed based at least in part on a determination that the first repetition 608 and the second repetition 610 were not received when scheduled. As another example, the base station may determine that the data transmission failed based at least in part on a determination that the data transmission could not be properly decoded. Based at least in part on determining that the data transmission of the UE failed, the base station may schedule retransmissions (for example, non-CG transmissions) of the first repetition 608 and the second repetition 610, as described in more detail above in connection with FIG. 5. For example, the base station may schedule a retransmission of a repetition on a component carrier using a same HARQ process identifier as the failed transmission of the repetition on the component carrier.

As shown in diagram 600, the base station may transmit a downlink control transmission 612 (for example, DCI) over the first component carrier (CC15) that schedules a retransmission of the first repetition 608 using the same HARQ process identifier (HARQ ID=0) as the failed transmission of the first repetition 608. Similarly, the base station may transmit a downlink control transmission 614 (for example, DCI) over the second component carrier (CC7) that schedules a retransmission of the second repetition 610 using the same HARQ process identifier (HARQ ID=7) as the failed transmission of the second repetition 610. The UE may transmit retransmissions 616, 618 according to the scheduling provided in the downlink control transmissions 612, 614.

The base station may combine received repetitions of a transmission in order to decode the transmission. In some aspects, the base station may combine repetitions of a transmission received in the same cycle in order to decode the transmission. For example, the base station may combine the first repetition 608 of the data transmission and the second repetition 610 of the data transmission in order to decode the data transmission. As another example, the base station may combine the retransmissions 616, 618 in order to decode a retransmission of the data transmission.

Figure 7:
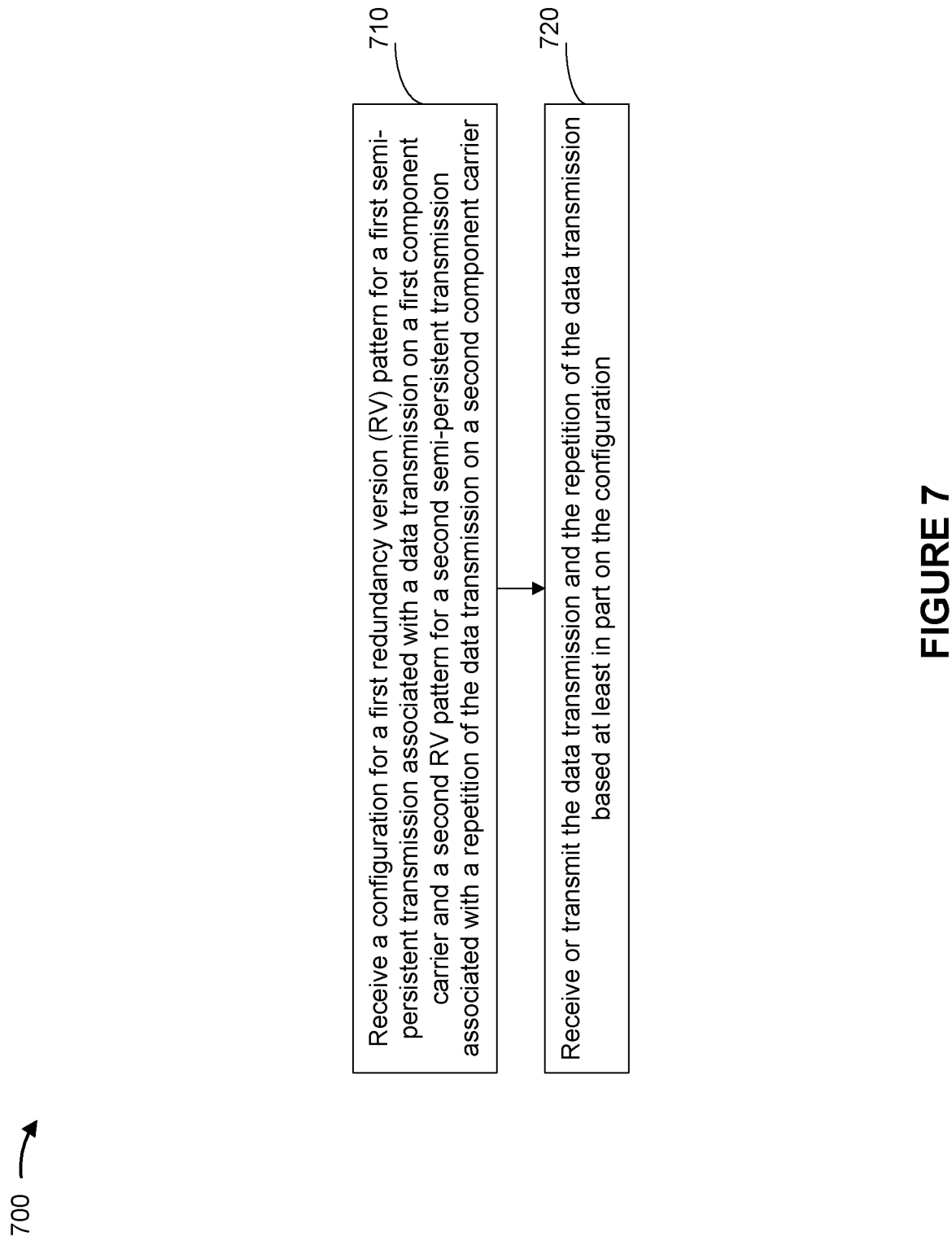
FIG. 7 is a diagram illustrating an example process performed by a UE in accordance with various aspects of the present disclosure.

FIG. 7 is a diagram illustrating an example process 700 performed, for example, by a UE, in accordance with various aspects of the present disclosure. Example process 700 is an example where a UE, such as UE 120 or UE 304, performs operations associated with redundancy version identification in cross-carrier repetition.

As shown in FIG. 7, in some aspects, process 700 may include receiving a configuration for a first RV pattern for a first semi-persistent transmission associated with a data transmission on a first component carrier and a second RV pattern for a second semi-persistent transmission associated with a repetition of the data transmission on a second component carrier (block 710). For example, the UE (using receive processor 258, controller/processor 280, or memory 282, among other possibilities/examples) may receive a configuration for a first RV pattern for a first semi-persistent transmission associated with a data transmission on a first component carrier and a second RV pattern for a second semi-persistent transmission associated with a repetition of the data transmission on a second component carrier, as described above.

As further shown in FIG. 7, in some aspects, process 700 may include receiving or transmitting the data transmission and the repetition of the data transmission based at least in part on the configuration (block 720). For example, the UE (using receive processor 258, transmit processor 264, controller/processor 280, or memory 282, among other possibilities/examples) may receive or transmit the data transmission and the repetition of the data transmission based at least in part on the configuration, as described above.

Process 700 may include additional aspects, such as any single aspect or any combination of aspects described below or in connection with one or more other processes described elsewhere herein.

In a first aspect, receiving the configuration is via RRC signaling, DCI signaling, or a MAC control element. In a second additional aspect, alone or in combination with the first aspect, the data transmission and the repetition of the data transmission are associated with a same transport block.

In a third additional aspect, alone or in combination with one or more of the first and second aspects, the data transmission is associated with a first RV identified in the configuration, and the repetition of the data transmission is associated with a second RV identified in the configuration. Accordingly, in some examples, receiving or transmitting the data transmission and the repetition of the data transmission includes receiving or transmitting the data transmission using the first RV and the repetition of the data transmission using the second RV. In a fourth additional aspect, alone or in combination with one or more of the first through third aspects, the configuration identifies a first RV for transmissions on the first component carrier and a second RV for transmissions on the second component carrier. Accordingly, in some examples, receiving or transmitting the data transmission and the repetition of the data transmission includes receiving or transmitting the data transmission on the first component carrier using the first RV and the repetition of the data transmission on the second component carrier using the second RV.

In a fifth additional aspect, alone or in combination with one or more of the first through fourth aspects, the configuration identifies a first RV order for the first component carrier and a second RV order for the second component carrier. Accordingly, in some examples, receiving or transmitting the data transmission and the repetition of the data transmission includes receiving or transmitting the data transmission on the first component carrier according to the first RV order and the repetition of the data transmission on the second component carrier according to the second RV order. In a sixth additional aspect, alone or in combination with one or more of the first through fifth aspects, an RV at an index location of the first RV order does not correspond to an RV at the index location of the second RV order. In a seventh additional aspect, alone or in combination with one or more of the first through sixth aspects, a first transmission cycle associated with the first component carrier and a second transmission cycle associated with the second component carrier have a same periodicity, and receiving or transmitting the data transmission and the repetition of the data transmission is according to a same start boundary of the first transmission cycle and the second transmission cycle.

In an eighth additional aspect, alone or in combination with one or more of the first through seventh aspects, the data transmission is associated with a first HARQ process identifier and the repetition of the data transmission is associated with a second HARQ process identifier. In a ninth additional aspect, alone or in combination with one or more of the first through eighth aspects, process 700 further includes transmitting NACK feedback for the data transmission and the repetition of the data transmission, and identifying retransmissions of the data transmission and the repetition of the data transmission based at least in part on DCI that identifies scheduling of the first HARQ process identifier and the second HARQ process identifier. In a tenth additional aspect, alone or in combination with one or more of the first through ninth aspects, the retransmissions are identified further based at least in part on the DCI being scrambled by a CS-RNTI and an NDI of the DCI indicating no new data.

In an eleventh additional aspect, alone or in combination with one or more of the first through tenth aspects, process 700 further includes generating a common ACK or NACK feedback to the retransmissions, and transmitting the common ACK or NACK feedback. In a twelfth additional aspect, alone or in combination with one or more of the first through eleventh aspects, process 700 further includes combining the data transmission and the repetition of the data transmission to decode the data transmission. In a thirteenth additional aspect, alone or in combination with one or more of the first through twelfth aspects, the first semi-persistent transmission and the second semi-persistent transmission are downlink transmissions in accordance with semi-persistent scheduling configurations or uplink transmissions in accordance with configured grants.

Figure 8:
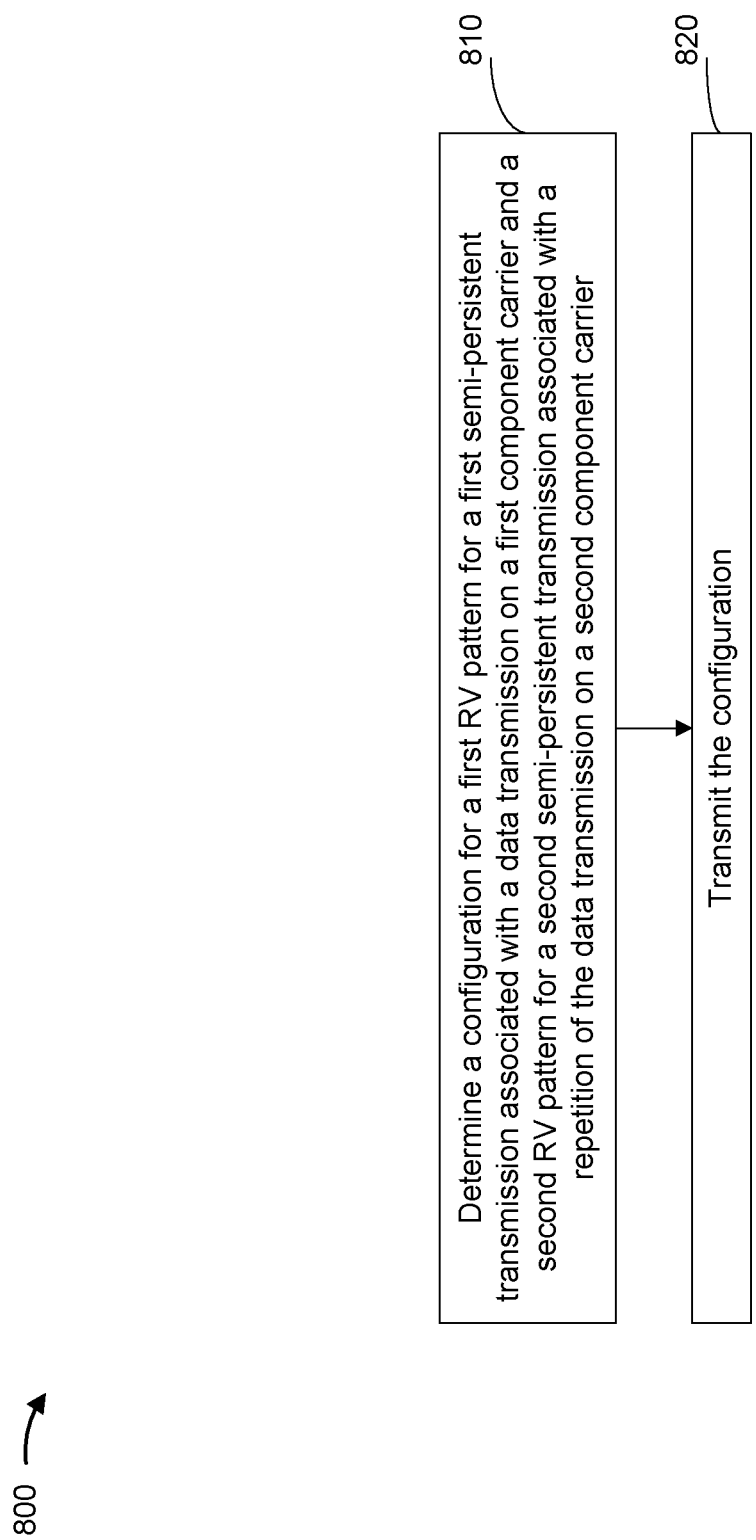
FIG. 8 is a diagram illustrating an example process performed by a BS in accordance with various aspects of the present disclosure.

FIG. 8 is a diagram illustrating an example process 800 performed, for example, by a base station, in accordance with various aspects of the present disclosure. Example process 800 is an example where a base station, such as base station 110 or base station 302, performs operations associated with redundancy version identification in cross-carrier repetition.

As shown in FIG. 8, in some aspects, process 800 may include determining a configuration for a first RV pattern for a first semi-persistent transmission associated with a data transmission on a first component carrier and a second RV pattern for a second semi-persistent transmission associated with a repetition of the data transmission on a second component carrier (block 810). For example, the base station (using controller/processor 240, memory 242, among other possibilities/examples) may determine a configuration for a first RV pattern for a first semi-persistent transmission associated with a data transmission on a first component carrier and a second RV pattern for a second semi-persistent transmission associated with a repetition of the data transmission on a second component carrier, as described above.

As further shown in FIG. 8, in some aspects, process 800 may include transmitting the configuration (block 820). For example, the base station (using transmit processor 220, controller/processor 240, memory 242, among other possibilities/examples) may transmit the configuration, as described above.

Process 800 may include additional aspects, such as any single aspect or any combination of aspects described below or in connection with one or more other processes described elsewhere herein.

In a first aspect, process 800 further includes transmitting or receiving the data transmission and the repetition of the data transmission according to the configuration. In a second additional aspect, alone or in combination with the first aspect, the data transmission and the repetition of the data transmission are associated with a same transport block. In a third additional aspect, alone or in combination with one or more of the first and second aspects, transmitting the configuration to the UE is via RRC signaling, DCI signaling, or a MAC control element.

In a fourth additional aspect, alone or in combination with one or more of the first through third aspects, the data transmission is associated with a first RV identified in the configuration, and the repetition of the data transmission is associated with a second RV identified in the configuration. Accordingly, in some examples, process 800 includes transmitting or receiving the data transmission using the first RV and the repetition of the data transmission using the second RV. In a fifth additional aspect, alone or in combination with one or more of the first through fourth aspects, the configuration identifies a first RV for transmissions on the first component carrier and a second RV for transmissions on the second component carrier. Accordingly, in some examples, process 800 includes transmitting or receiving the data transmission on the first component carrier using the first RV and the repetition of the data transmission on the second component carrier using the second RV.

In a sixth additional aspect, alone or in combination with one or more of the first through fifth aspects, the configuration identifies a first RV order for the first component carrier and a second RV order for the second component carrier. Accordingly, in some examples, process 800 includes transmitting or receiving the data transmission on the first component carrier according to the first RV order and the repetition of the data transmission on the second component carrier according to the second RV order. In a seventh additional aspect, alone or in combination with one or more of the first through sixth aspects, an RV at an index location of the first RV order does not correspond to an RV at the index location of the second RV order.

In an eighth additional aspect, alone or in combination with one or more of the first through seventh aspects, the data transmission is associated with a first HARQ process identifier and the repetition of the data transmission is associated with a second HARQ process identifier. In a ninth additional aspect, alone or in combination with one or more of the first through eighth aspects, process 800 further includes receiving NACK feedback for the data transmission and the repetition of the data transmission, and scheduling retransmissions of the data transmission and the repetition of the data transmission using the first HARQ process identifier and the second HARQ process identifier.

In a tenth additional aspect, alone or in combination with one or more of the first through ninth aspects, process 800 further includes transmitting DCI that schedules the retransmissions, where the DCI is scrambled by a CS-RNTI, and an NDI of the DCI indicates no new data. In an eleventh additional aspect, alone or in combination with one or more of the first through tenth aspects, process 800 further includes determining that transmissions of the data transmission and the repetition of the data transmission failed, and scheduling retransmissions of the data transmission and the repetition of the data transmission using the first HARQ process identifier and the second HARQ process identifier.

In a twelfth additional aspect, alone or in combination with one or more of the first through eleventh aspects, process 800 further includes combining the data transmission and the repetition of the data transmission to decode the data transmission. In a thirteenth additional aspect, alone or in combination with one or more of the first through twelfth aspects, the first semi-persistent transmission and the second semi-persistent transmission are downlink transmissions in accordance with semi-persistent scheduling configurations or uplink transmissions in accordance with configured grants.

Figure 9:
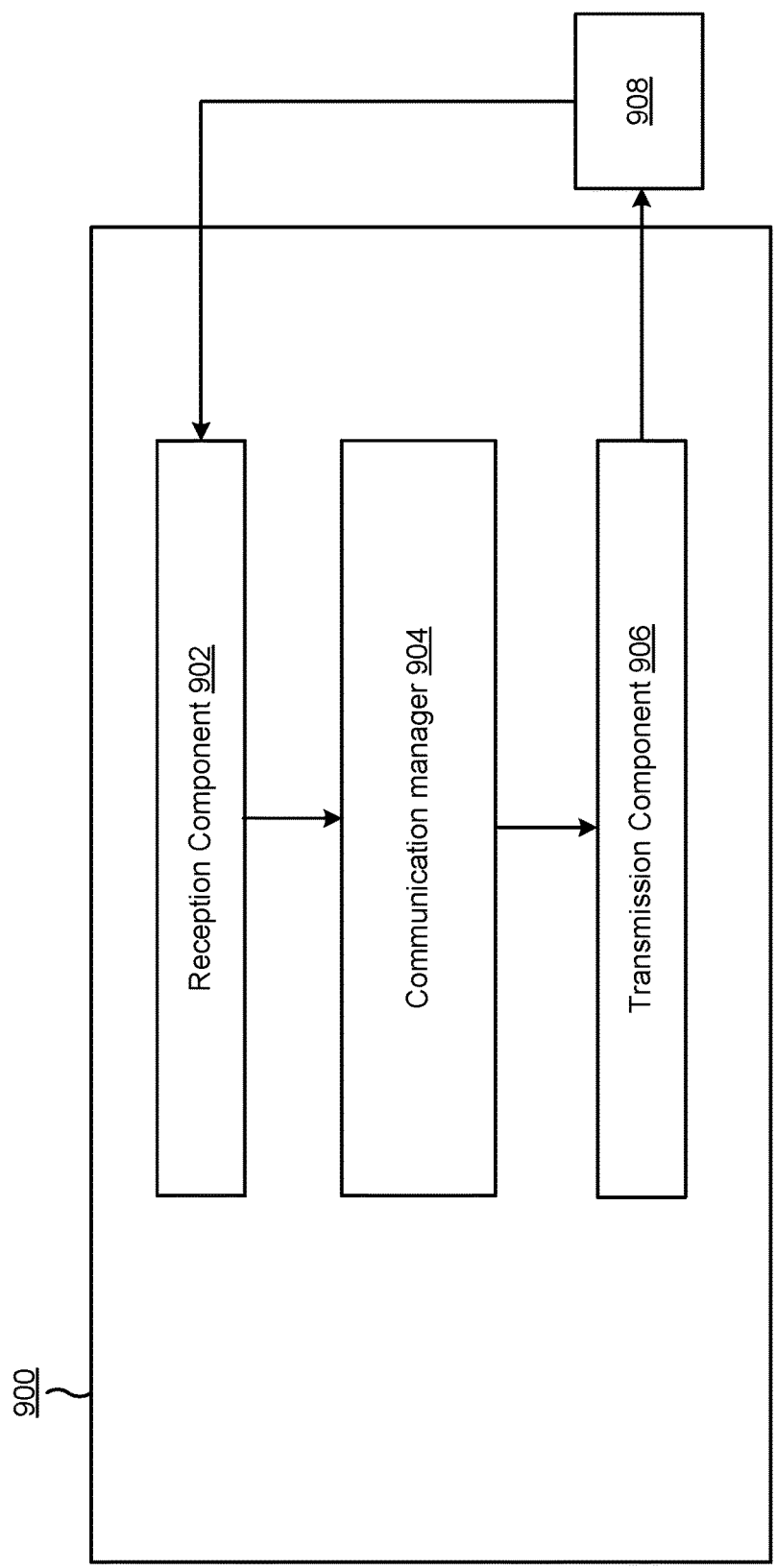
FIGS. 9 and 10 are block diagrams of example apparatuses for wireless communication in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 3-6. Additionally or alternatively, the apparatus 900 may be configured to perform one or more processes described herein, such as process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be collocated with the reception component 902 in a transceiver.

The communication manager 904 may receive or may cause the reception component 902 to receive a configuration for a first RV pattern for a first semi-persistent transmission (for example, a CG transmission, an SPS transmission, or a periodic transmission) associated with a data transmission on a first component carrier and a second RV pattern for a second semi-persistent transmission associated with a repetition of the data transmission on a second component carrier. In some examples, the communication manager 904 may receive or may cause the reception component 902 to receive the data transmission and the repetition of the data transmission based at least in part on the configuration. In some other examples, the communication manager 904 may transmit or may cause the transmission component 906 to transmit the data transmission and the repetition of the data transmission based at least in part on the configuration. In some aspects, the communication manager 904 may include a controller/processor, a memory, or a combination thereof, of the UE described above in connection with FIG. 2.

In some aspects, the data transmission may be associated with a first RV identified in the first RV pattern and the repetition of the data transmission may be associated with a second RV identified in the second RV pattern (for example, the first RV and the second RV are different). In some aspects, the first RV pattern may identify a first RV for transmissions on the first component carrier and the second RV pattern may identify a second RV for transmissions on the second component carrier. In some aspects, the first RV pattern may identify a first RV order for transmissions on the first component carrier and the second RV pattern may identify a second RV order for transmissions on the second component carrier.

In some aspects, the data transmission may be associated with a first HARQ process identifier and the repetition of the data transmission may be associated with a second HARQ process identifier. In some aspects, the communication manager 904 may transmit or may cause the transmission component 906 to transmit NACK feedback for the data transmission and the repetition of the data transmission. In addition, the communication manager 904 may identify retransmissions of the data transmission and the repetition of the data transmission based at least in part on DCI that identifies scheduling of the first HARQ process identifier and the second HARQ process identifier.

In some aspects, the communication manager 904 may include a set of components associated with performing operations described herein. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
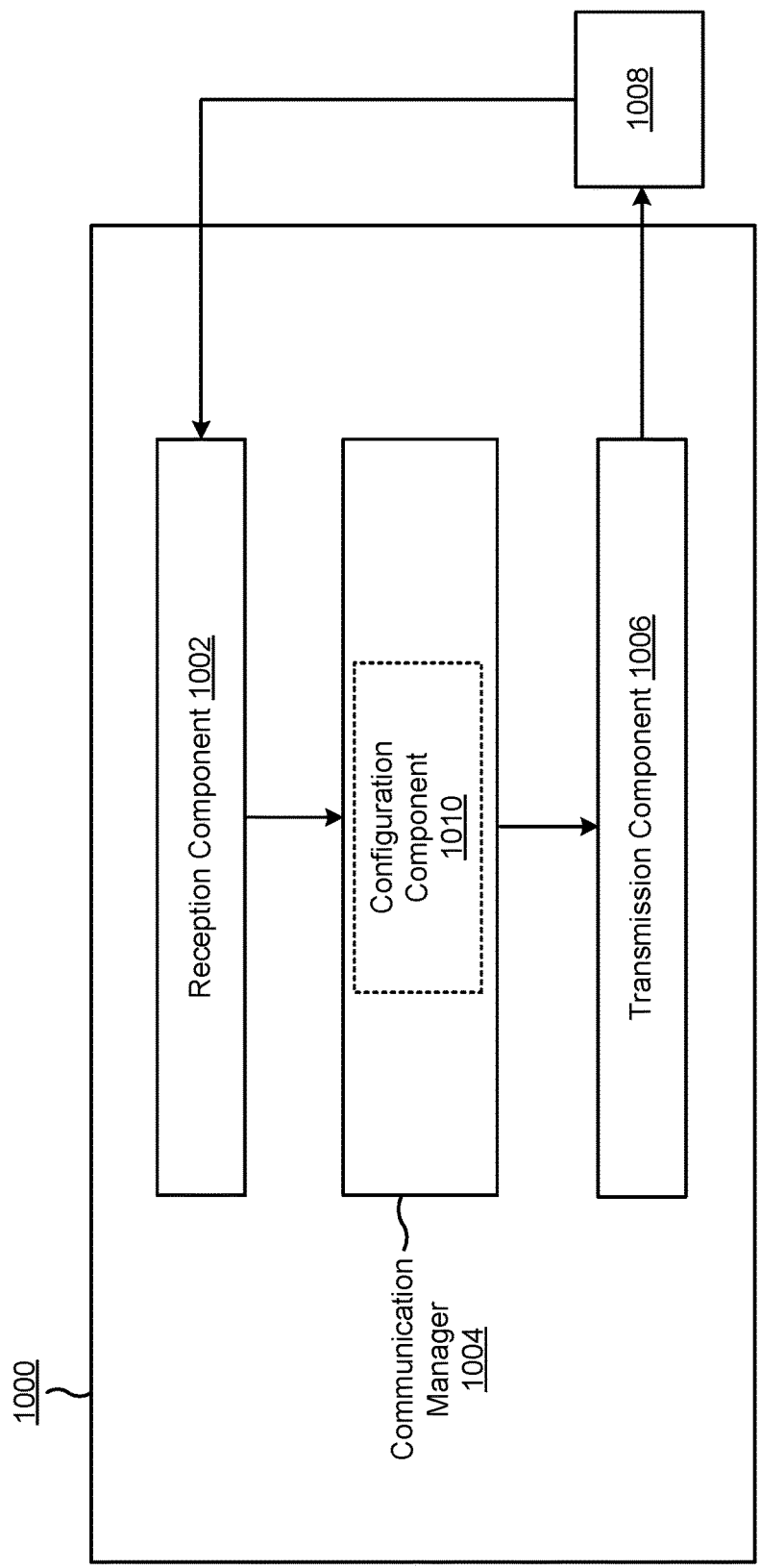

FIG. 10 is a block diagram of an example apparatus 1000 for wireless communication. The apparatus 1000 may be a base station, or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 3-6. Additionally or alternatively, the apparatus 1000 may be configured to perform one or more processes described herein, such as process 800 of FIG. 8, or a combination thereof. In some aspects, the apparatus 1000 may include one or more components of the base station described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be collocated with the reception component 1002 in a transceiver.

The communication manager 1004 may determine a configuration for a first RV pattern for a first semi-persistent transmission associated with a data transmission on a first component carrier and a second RV pattern for a second semi-persistent transmission associated with a repetition of the data transmission on a second component carrier. The communication manager 1004 may transmit or may cause the transmission component 1006 to transmit the configuration. In some aspects, the communication manager 1004 may include a controller/processor, a memory, a scheduler, a communication unit, or a combination thereof, of the base station described above in connection with FIG. 2.

In some aspects, the communication manager 1004 may include a set of components, such as a configuration component 1010. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The configuration component 1010 may determine a configuration for a first RV pattern for a first semi-persistent transmission associated with a data transmission on a first component carrier and a second RV pattern for a second semi-persistent transmission associated with a repetition of the data transmission on a second component carrier. In some examples, the communication manager 1004 may receive or may cause the reception component 1002 to receive the data transmission and the repetition of the data transmission based at least in part on the configuration. In some other examples, the communication manager 1004 may transmit or may cause the transmission component 1006 to transmit the data transmission and the repetition of the data transmission based at least in part on the configuration.

In some aspects, the data transmission may be associated with a first RV identified in the first RV pattern and the repetition of the data transmission may be associated with a second RV identified in the second RV pattern (for example, the first RV and the second RV are different). In some aspects, the first RV pattern may identify a first RV for transmissions on the first component carrier and the second RV pattern may identify a second RV for transmissions on the second component carrier. In some aspects, the first RV pattern may identify a first RV order for transmissions on the first component carrier and the second RV pattern may identify a second RV order for transmissions on the second component carrier.

In some aspects, the data transmission may be associated with a first HARQ process identifier and the repetition of the data transmission may be associated with a second HARQ process identifier. In some aspects, the communication manager 1004 may receive or may cause the reception component 1002 to receive NACK feedback for the data transmission and the repetition of the data transmission. In addition, the communication manager 1004 may schedule retransmissions of the data transmission and the repetition of the data transmission using the first HARQ process identifier and the second HARQ process identifier.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration for a first redundancy version (RV) pattern for a first semi-persistent transmission associated with a data transmission on a first component carrier and a second RV pattern for a second semi-persistent transmission associated with a repetition of the data transmission on a second component carrier;
   receiving or transmitting the data transmission and the repetition of the data transmission based at least in part on the configuration, wherein the data transmission is associated with a first identifier and the repetition of the data transmission is associated with a second identifier; and
   identifying one or more of retransmissions of the data transmission or the repetition of the data transmission based at least in part on information that identifies scheduling of the first identifier and the second identifier.

2. The method of claim 1, wherein the data transmission is associated with a first RV identified in the first RV pattern and the repetition of the data transmission is associated with a second RV identified in the second RV pattern.

3. The method of claim 1, wherein the first RV pattern identifies a first RV for transmissions on the first component carrier and the second RV pattern identifies a second RV for transmissions on the second component carrier.

4. The method of claim 1, wherein the first RV pattern identifies a first RV order for transmissions on the first component carrier and the second RV pattern identifies a second RV order for transmissions on the second component carrier.

5. The method of claim 4, wherein an RV at an index location of the first RV order does not correspond to an RV at an index location of the second RV order.

6. The method of claim 1, wherein the first semi-persistent transmission and the second semi-persistent transmission have a same periodicity, and wherein receiving or transmitting the data transmission and the repetition of the data transmission is according to a same start boundary of the first semi-persistent transmission and the second semi-persistent transmission.

7. The method of claim 1, wherein the first identifier is a first hybrid automatic repeat request (HARQ) process identifier, and wherein the second identifier is a second HARQ process identifier.

8. The method of claim 7, further comprising transmitting negative-acknowledgment feedback for the data transmission and the repetition of the data transmission, wherein the information comprises downlink control information (DCI) that identifies scheduling of the first HARQ process identifier and the second HARQ process identifier.

9. The method of claim 8, wherein the retransmissions are identified further based at least in part on the DCI being scrambled by a configured scheduling-radio network temporary identifier and a new data indicator of the DCI indicating no new data.

10. The method of claim 1, wherein the first semi-persistent transmission and the second semi-persistent transmission are downlink transmissions in accordance with semi-persistent scheduling configurations or uplink transmissions in accordance with configured grants.

11. A method of wireless communication performed by a network entity, comprising:

transmitting a configuration for a first redundancy version (RV) pattern for a first semi-persistent transmission associated with a data transmission on a first component carrier and a second RV pattern for a second semi-persistent transmission associated with a repetition of the data transmission on a second component carrier, wherein the data transmission is associated with a first identifier and the repetition of the data transmission is associated with a second identifier; and scheduling retransmissions of the data transmission and the repetition of the data transmission using the first identifier and the second identifier.

12. The method of claim 11, further comprising transmitting or receiving the data transmission and the repetition of the data transmission according to the configuration.

13. The method of claim 11, wherein the data transmission is associated with a first RV identified in the first RV pattern and the repetition of the data transmission is associated with a second RV identified in the second RV pattern.

14. The method of claim 11, wherein the first RV pattern identifies a first RV for transmissions on the first component carrier and the second RV pattern identifies a second RV for transmissions on the second component carrier.

15. The method of claim 11, wherein the first RV pattern identifies a first RV order for transmissions on the first component carrier and the second RV pattern identifies a second RV order for transmissions on the second component carrier.

16. The method of claim 15, wherein an RV at an index location of the first RV order does not correspond to an RV at an index location of the second RV order.

17. The method of claim 11, wherein the first identifier is a first hybrid automatic repeat request (HARQ) process identifier, and wherein the second identifier is a second HARQ process identifier.

18. The method of claim 11, further comprising receiving negative-acknowledgment feedback for the data transmission and the repetition of the data transmission.

19. The method of claim 11, further comprising transmitting downlink control information (DCI) that schedules the retransmissions, wherein the DCI is scrambled by a configured scheduling-radio network temporary identifier and a new data indicator of the DCI indicates no new data.

20. The method of claim 11, wherein the first semi-persistent transmission and the second semi-persistent transmission are downlink transmissions in accordance with semi-persistent scheduling configurations or uplink transmissions in accordance with configured grants.

21. A user equipment (UE) for wireless communication, comprising:

a memory; and
one or more processors operatively coupled to the memory, the one or more processors configured to:
receive a configuration for a first redundancy version (RV) pattern for a first semi-persistent transmission associated with a data transmission on a first component carrier and a second RV pattern for a second semi-persistent transmission associated with a repetition of the data transmission on a second component carrier;
receive or transmit the data transmission and the repetition of the data transmission based at least in part on the configuration, wherein the data transmission is associated with a first identifier and the repetition of the data transmission is associated with a second identifier; and
identify one or more of retransmissions of the data transmission or the repetition of the data transmission based at least in part on information that identifies scheduling of the first identifier and the second identifier.

22. The UE of claim 21, wherein the data transmission is associated with a first RV identified in the first RV pattern and the repetition of the data transmission is associated with a second RV identified in the second RV pattern.

23. The UE of claim 21, wherein the first RV pattern identifies a first RV for transmissions on the first component carrier and the second RV pattern identifies a second RV for transmissions on the second component carrier.

24. The UE of claim 21, wherein the first RV pattern identifies a first RV order for transmissions on the first component carrier and the second RV pattern identifies a second RV order for transmissions on the second component carrier.

25. The UE of claim 24, wherein an RV at an index location of the first RV order does not correspond to an RV at an index location of the second RV order.

26. A network entity for wireless communication, comprising:

a memory; and
one or more processors operatively coupled to the memory, the one or more processors configured to:
transmit a configuration for a first redundancy version (RV) pattern for a first semi-persistent transmission associated with a data transmission on a first component carrier and a second RV pattern for a second semi-persistent transmission associated with a repetition of the data transmission on a second component carrier, wherein the data transmission is associated with a first identifier and the repetition of the data transmission is associated with a second identifier; and
schedule retransmissions of the data transmission and the repetition of the data transmission using the first identifier and the second identifier.

27. The network entity of claim 26, wherein the data transmission is associated with a first RV identified in the first RV pattern and the repetition of the data transmission is associated with a second RV identified in the second RV pattern.

28. The network entity of claim 26, wherein the first RV pattern identifies a first RV for transmissions on the first component carrier and the second RV pattern identifies a second RV for transmissions on the second component carrier.

29. The network entity of claim 26, wherein the first RV pattern identifies a first RV order for transmissions on the first component carrier and the second RV pattern identifies a second RV order for transmissions on the second component carrier.

30. The network entity of claim 29, wherein an RV at an index location of the first RV order does not correspond to an RV at an index location of the second RV order.

31. The UE of claim 21, wherein the first identifier is a first hybrid automatic repeat request (HARQ) process identifier, and wherein the second identifier is a second HARQ process identifier.

32. The UE of claim 21, wherein the first identifier is a first numerical value, and wherein the second identifier is a second numerical value that is different than the first numerical value.

\* \* \* \* \*